United States Patent
Song et al.

(10) Patent No.: US 10,309,668 B2
(45) Date of Patent: Jun. 4, 2019

(54) ZONAL DEMAND CONTROL VENTILATION FOR A BUILDING

(71) Applicant: Siemens Aktiengesellschaft, Munich (DE)

(72) Inventors: Zhen Song, Plainsboro, NJ (US); Sanjeev Srivastava, Princeton, NJ (US); Dmitriy Okunev, Lawrenceville, NJ (US); Lingyun Wang, Princeton, NJ (US)

(73) Assignee: Siemens Industry, Inc., Alpharetta, GA (US)

( * ) Notice: Subject to any disclaimer, the term of this patent is extended or adjusted under 35 U.S.C. 154(b) by 454 days.

(21) Appl. No.: 14/940,194

(22) Filed: Nov. 13, 2015

(65) Prior Publication Data

US 2017/0138623 A1    May 18, 2017

(51) Int. Cl.
*F24F 11/62*        (2018.01)
*F24F 11/30*        (2018.01)
(Continued)

(52) U.S. Cl.
CPC ............ *F24F 11/0001* (2013.01); *F24F 3/00* (2013.01); *F24F 3/0442* (2013.01); *F24F 3/06* (2013.01);
(Continued)

(58) Field of Classification Search
CPC ...... F24F 11/0001; F24F 11/0034; F24F 3/00; F24F 11/006; F24F 2011/0061; F24F 2011/0002
See application file for complete search history.

(56) References Cited

U.S. PATENT DOCUMENTS 4,724,516 A * 2/1988 Day ................... G05B 11/28
                                                    318/599
4,928,750 A    5/1990 Nurczyk
(Continued)

FOREIGN PATENT DOCUMENTS

JP    S55137440 A  * 10/1980
JP    2000088316 A *  3/2000
(Continued)

OTHER PUBLICATIONS

Hattori et al., Equipment for Determining Set Temperature . . . Medium, Mar. 31, 2000, JP2000088316A, Whole Document.*
(Continued)

*Primary Examiner* — Larry L Furdge

(57) ABSTRACT

A method for operating an air handling unit of an HVAC system. The method includes opening an outside air flow control device to enable breathing air flow during a high outdoor air time period to a first zone having a first number of occupants and a second zone having a second number of occupants that is less than the first number of occupants. The outside air flow control device is then closed to enable conditioning air flow during a low outdoor air time period to the first and second zones. Further, a variable air volume (VAV) air flow control device provides desired amounts of breathing air to the first and second zones suitable for the first and second number of occupants, respectively. A VAV air temperature control device then provides conditioning air to the first and second zones having a suitable temperature for the first and second number of occupants.

13 Claims, 10 Drawing Sheets

(51) Int. Cl.
  *F24F 11/00* (2018.01)
  *F24F 3/00* (2006.01)
  *F24F 3/06* (2006.01)
  *F24F 3/044* (2006.01)
  *F24F 11/63* (2018.01)
  *F24F 110/70* (2018.01)
  *F24F 11/58* (2018.01)
  *F24F 120/10* (2018.01)
  *F24F 110/50* (2018.01)
  *F24F 110/10* (2018.01)
  *F24F 11/46* (2018.01)

(52) U.S. Cl.
  CPC .............. *F24F 11/30* (2018.01); *F24F 11/62* (2018.01); *F24F 11/46* (2018.01); *F24F 11/58* (2018.01); *F24F 11/63* (2018.01); *F24F 2011/0002* (2013.01); *F24F 2110/10* (2018.01); *F24F 2110/50* (2018.01); *F24F 2110/70* (2018.01); *F24F 2120/10* (2018.01); Y02B 30/767 (2013.01)

(56) References Cited

U.S. PATENT DOCUMENTS

| | | | | |
|---|---|---|---|---|
| 5,119,987 | A | * | 6/1992 | Kobayashi ................ F24F 7/08 236/49.3 |
| 5,261,483 | A | * | 11/1993 | Imaoka .................... F24F 3/06 165/219 |
| 5,279,609 | A | | 1/1994 | Meckler |
| 5,831,244 | A | * | 11/1998 | Springer, Jr. ........ B60H 1/2218 219/203 |
| 8,190,273 | B1 | | 5/2012 | Federspiel et al. |
| 8,297,524 | B2 | * | 10/2012 | Kucera ................... F23N 3/085 236/1 G |
| 2003/0089319 | A1 | * | 5/2003 | Duvinage ................ B60H 1/02 123/41.02 |
| 2008/0004754 | A1 | | 1/2008 | Pouchak et al. |
| 2008/0076346 | A1 | * | 3/2008 | Ahmed ................ F24F 11/0017 454/256 |
| 2013/0197678 | A1 | * | 8/2013 | Ara ........................ G06Q 10/10 700/83 |
| 2013/0231792 | A1 | | 9/2013 | Ji et al. |
| 2014/0326428 | A1 | * | 11/2014 | Meirav ................. F24F 3/1603 165/11.1 |

FOREIGN PATENT DOCUMENTS

| | | |
|---|---|---|
| WO | 2008051222 A1 | 5/2008 |
| WO | WO2013/019862 A1 | 2/2013 |
| WO | WO2013/056214 A1 | 4/2013 |
| WO | WO2014/043313 A1 | 3/2014 |

OTHER PUBLICATIONS

Matsuda et al., Air Conditioning Apparatus, Oct. 27, 1980, JPS55137440A, Whole Document.*

PCT International Search Report dated Jan. 17, 2017 corresponding to PCT International Application No. PCT/US2016/059854 filed Nov. 1, 2016 (20 pages).

J Zhang, RG Lutes, G Liu, MR Branbley, "Energy Savings for Occupancy-Based Control (OBC) of Variable-Air-Volume (VAV) Systems", Jan. 2013, Pacific Northwest National Laboratory, Richland, Washington, US.

* cited by examiner

```
{
"kind": "calendar#event",
"etag": etag,
"id": string,
"status": string,
"htmlLink": string,
"created": datetime,
"updated": datetime,
"summary": string,
"description": string,
"location": string,
"colorId": string,
"creator": {
  "id": string,
  "email": string,
  "displayName": string,
  "self": boolean
},
"organizer": {
  "id": string,
  "email": string,
  "displayName": string,
  "self": boolean
},
"start": {
  "date": date,
  "dateTime": datetime,
  "timeZone": string
},
"end": {
  "date": date,
  "dateTime": datetime,
  "timeZone": string
},
"endTimeUnspecified": boolean,
"recurrence": [
  string
],
"recurringEventId": string,
"originalStartTime": {
  "date": date,
  "dateTime": datetime,
  "timeZone": string
},
"transparency": string,
"visibility": string,
"iCalUID": string,
"sequence": integer,
"attendees": [
  {
    "id": string,
    "email": string,
    "displayName": string,
    "organizer": boolean,
    "self": boolean,
```

```
      "resource": boolean,
      "optional": boolean,
      "responseStatus": string,
      "comment": string,
      "additionalGuests": integer
    }
  ],
  "attendeesOmitted": boolean,
  "extendedProperties": {
    "private": {
      (key): string
    },
    "shared": {
      (key): string
    }
  },
  "hangoutLink": string,
  "gadget": {
    "type": string,
    "title": string,
    "link": string,
    "iconLink": string,
    "width": integer,
    "height": integer,
    "display": string,
    "preferences": {
      (key): string
    }
  },
  "anyoneCanAddSelf": boolean,
  "guestsCanInviteOthers": boolean,
  "guestsCanModify": boolean,
  "guestsCanSeeOtherGuests": boolean,
  "privateCopy": boolean,
  "locked": boolean,
  "reminders": {
    "useDefault": boolean,
    "overrides": [
      {
        "method": string,
        "minutes": integer
      }
    ]
  },
  "source": {
    "url": string,
    "title": string
  }
}
```

ZONAL DEMAND CONTROL VENTILATION FOR A BUILDING

BACKGROUND

1. Technical Field

Aspects of the invention relate to demand control ventilation for a building having a heating, ventilation, and air conditioning system, and more particularly, to a method for operating an air handling unit to provide a desired amount of breathing air to a first zone suitable for a first number of occupants and to a second zone suitable for a second number of occupants and to provide conditioning air to the first zone having a suitable temperature for the first number of occupants and conditioning air to the second zone having a suitable temperature for the second number of occupants wherein variable air volume (VAV), rooftop unit (RTU) and air handling unit (AHU) temperature and air flow actuators are alternated in a novel control sequence.

2. Description of Related Art

Demand Control Ventilation (DCV) is a method for both responding to occupant ventilation demand and achieving energy savings in a building or other occupied space. In DCV, a level of carbon dioxide ($CO_2$) detected in the building air is used to adjust or control an amount of fresh air (i.e. outdoor ventilation) supplied to the building by an air handling unit (AHU) of a heating, ventilation, and air conditioning (HVAC) system to ensure that ventilation requirements are met and the level of $CO_2$ is reduced. In order to reduce cost, a single $CO_2$ sensor, located in a return air duct of the AHU, is used rather than providing a $CO_2$ sensor for each thermal (i.e. heating/cooling) zone of a building. Therefore, the sensor measures an averaged $CO_2$ level of the entire building. Adjustments of an outdoor air damper of a corresponding rooftop unit (RTU) and/or AHU of the HVAC system are then based on the averaged $CO_2$ level.

Conventional DCV methods cannot adjust the $CO_2$ level of individual zones in a building according to the number of occupants in a respective individual zone. If a zone has relatively many occupants, there may not be sufficient outdoor air in the zone to meet health requirements (i.e. the zone is under ventilated). In order to increase the likelihood that a minimal ventilation requirement for each zone is met, American Society of Heating, Refrigerating and Air-Conditioning Engineers (ASHRAE) Standard 62.1 suggests 5 cubic feet per minute (CFM) fresh air per person. The Leadership in Energy and Environmental Design (LEED) standard demands that an additional 30% outdoor air is provided, as compared to the ASHRAE standard. In conventional DCV methods, the $CO_2$ sensor in the return duct measures an averaged, whole building fresh air level. The conventional methods only ensure at least 5 CFM per person fresh air intake for the whole building. The conventional methods do not ensure fresh air is distributed to different zones according to the number of occupants in the zone. In standard single duct systems, the fresh air ratio in the supply air is the same for each zone. On one hand, there is not enough fresh air for zones with more occupants. On the other hand, zones with relatively fewer occupants may be over ventilated thus wasting energy. Further, since standard buildings have one duct system, breathing air and conditioning air (i.e. air used for air conditioning purposes) are mixed.

SUMMARY

The conditioning air and breathing air are coupled in a conventional HVAC system. In conventional VAV systems, the AHU outdoor air damper is controlled by $CO_2$ feedback loop based on the $CO_2$ sensor in the return duct. The AHU outdoor air damper and VAV box dampers are not coordinated. In order to decouple the breathing air and conditioning air, therefore ensuring fresh air at individual thermal zone, a Pulse Width Modulation (PWM) control sequence in accordance with aspects of the present invention is used. This control sequence provides sufficient out door air per requirements for an individual zone by decoupling breathing air and conditioning air at different time slots. The PWM method in accordance with aspects of the present invention includes two novel features: i.e., "high outdoor air" and "low outdoor air" time periods. During the high outdoor air time periods, the AHU outdoor air damper is opened relatively widely, such the supply air duct is mainly used to provide fresh air. During the low outdoor air periods, the AHU outdoor air damper is substantially closed, and the HVAC system is mainly used to circulate air for conditioning purposes. This method provides virtual dual ventilation channels in a single duct system.

A method for operating an air handling unit (AHU) of a heating, ventilation, and air conditioning system is disclosed. The AHU is associated with first and second thermal zones of an enclosed space, wherein the AHU includes an outside air flow control device and a variable air volume (VAV) device associated with the first and second zones and wherein each VAV device includes a VAV air flow control device and a VAV air temperature control device. The method includes opening the outside air flow control device to enable breathing air flow in a supply duct during a high outdoor air time period, wherein the supply duct conveys breathing air to the first and second zones. In particular, the first zone includes a first number of occupants and the second zone includes a second number of occupants that is less than the first number of occupants. The method also includes closing the outside air flow control device to enable conditioning air flow into the supply duct during a low outdoor air time period, wherein the supply duct conveys conditioning air to the first and second zones. In addition, the VAV air flow control device is operated to provide a desired amount of breathing air to the first zone suitable for the first number of occupants and breathing air to the second zone suitable for the second number of occupants, wherein the VAV air flow control device is operated during the high and low outdoor air time periods. Further, the method includes operating the VAV air temperature control device to provide conditioning air to the first zone having a suitable temperature for the first number of occupants and conditioning air to the second zone having a suitable temperature for the second number of occupants, wherein the VAV air temperature control device is operated during the high and low outdoor air time periods.

Those skilled in the art may apply the respective features of aspects of the present invention jointly or severally in any combination or sub-combination.

BRIEF DESCRIPTION OF THE DRAWINGS

The teachings of several aspects of the present invention can be readily understood by considering the following detailed description in conjunction with the accompanying drawings, in which:

FIGS. 3A and 3B depict exemplary resource representations of a calendar event.

To facilitate understanding, identical reference numerals have been used, where possible, to designate identical elements that are common to the figures.

DETAILED DESCRIPTION

Figure 1:
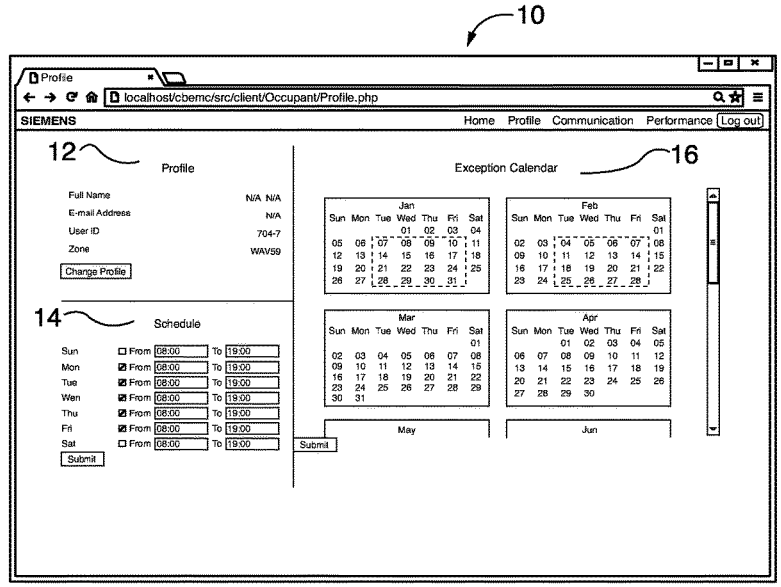
FIG. 1 depicts and exemplary web portal for inputting occupancy information of a zone in a building.

Although various embodiments that incorporate the teachings of aspects of the present invention have been shown and described in detail herein, those skilled in the art can readily devise many other varied embodiments that still incorporate these teachings. Aspects of the invention are not limited in its application to the exemplary embodiment details of construction and the arrangement of components set forth in the description or illustrated in the drawings. Aspects of the invention are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Aspects of the present invention employ a zonal demand control ventilation (DCV) method for buildings or other occupied spaces. In particular, occupancy information for each heating/cooling zone in a building may be captured from either a web portal or calendar software by using a device such as a computer, an embedded device or a personal electronic device such as a mobile phone. Based on the number of occupants and the readings of a $CO_2$ sensor in a return duct of an HVAC system, a $CO_2$ level of each zone may be estimated thereby forming a virtual $CO_2$ sensor arrangement.

Figure 2:
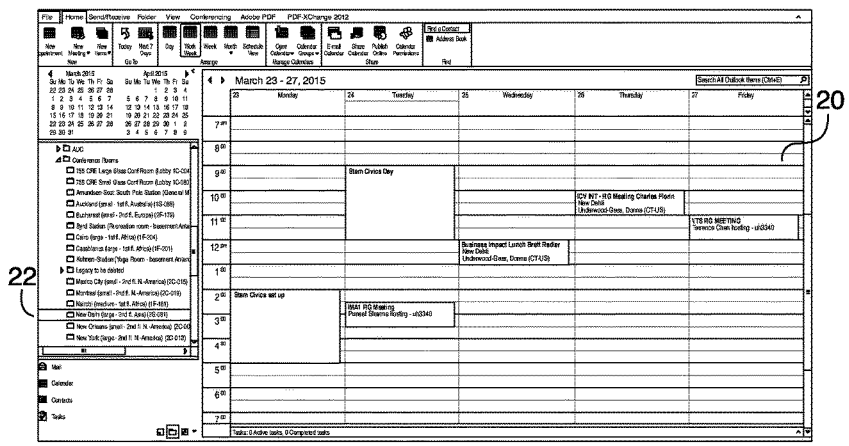
FIG. 2 is an exemplary view of a Microsoft Outlook® calendar depicting calendar information for a conference room.

Referring to FIG. 1, an exemplary web portal 10 is shown. The web portal 10 may include user profile 12, daily schedule 14 and monthly calendar 16 input areas. Each occupant inputs their respective schedule (i.e. month, day and time) into the web portal 10 and requests a specific temperature during a time period for a specific zone. Based on occupant input, the number of occupants in a specific zone during each time period is then calculated. Alternatively, occupancy for each heating/cooling zone in a building may be captured from calendar software such as that available in Microsoft Outlook® messaging software sold by Microsoft Corporation of Redmond, Wash., US. Since such calendar software is widely used in today's business environment, minimal or no additional effort is required on the part of an occupant to provide their schedule. Referring to FIG. 2, an exemplary Microsoft Outlook® calendar 18 is shown. In particular, FIG. 2 depicts a calendar 20 of a conference room 22 (i.e. New Delhi, for example). In use, an organizer of a meeting can add an event in the calendar 18. The event includes information such as the identity of the organizer, beginning and end times of the meeting, whether an attendee accepted or rejected a meeting request, names, email addresses and other information associated with an attendee and the subject of the meeting.

Figure 4:
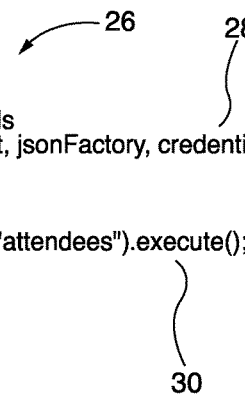
FIG. 4 shows an exemplary source code written in JAVA programming language for retrieving occupancy information from a Google Calendar™ event.

Alternatively, occupancy information may be obtained from other commercially available calendar software such Google Calendar™ calendaring application provided by Google Inc. of Mountain View, Calif., US. Access to calendar information in the Google Calendar™ calendaring application may be obtained by using representational state transfer (i.e. REST) application programming interfaces (i.e. APIs) or client libraries available from Google Inc. The REST APIs may be considered as Hypertext Transfer Protocol (i.e. HTTP) requests and responses from Google Calendar™ services. Further, the client libraries are available in many languages and frameworks adapted for programming directly with HTTP. The Google Calendar™ API typically includes the following resources: access control list (i.e. ACL), CalendarList, Calendars, Colors, Events Freebusy and Settings. It is desired to retrieve events of a given day and corresponding properties of an event, such as the maximum number of attendees to include in the response (i.e. maxAttendees). In particular, FIGS. 3A and 3B depict exemplary resource representations (properties) 24 of a calendar event. A computer program may then be used to retrieve occupancy information from a Google Calendar™ event. Referring to FIG. 4, exemplary source code 26 written in JAVA programming language for retrieving occupancy information from a Google Calendar™ event is shown. JAVA is a registered trademark of Oracle Corporation of Redwood Shores, Calif., US. In an aspect, a calendar object 28 is created and event information 30 is then retrieved from the calendar object 28.

As previously described, a single $CO_2$ sensor located in a return air duct of a building HVAC system is used to detect the $CO_2$ level in the return air duct. In accordance with aspects of the invention, once the number of occupants in each zone is obtained, the $CO_2$ level in each zone is then calculated by solving for C(t) in Equation (1):

$$P_z(t) = \frac{v \frac{C(t) - C(t - \Delta t)}{\Delta t} + Q_s(t)[C(t) - C_s(t)]}{G \times 1{,}000{,}000} \tag{1}$$

where:
P_z(t)=number of people in a building zone;
v=zone volume, ft$^3$ (calculated based on dimensions of zone);
C(t)=zone $CO_2$ concentration, ppm (parts per million);
C(t−Δt)=zone $CO_2$ concentration one time step back, ppm;
Δt=time step in minutes; typical sampling time for a building automation system is 5 or 15 minutes;
$Q_s$=supply airflow to the zone, CFM (cubic feet per minute) (measured by a controller having an airflow sensor located in the zone);
$C_s$(t)=$CO_2$ concentration of supply air, ppm; and
G=$CO_2$ generation rate per person, CFM; (value is obtained from Figure C-2 in ASHRAE Standard 62.1-2010); for light office work, G=0.0105 CFM.

In regard to Equation (1), the disclosure of a publication entitled USING CARBON DIOXIDE MEASUREMENTS TO DETERMINE OCCUPANCY FOR VENTILATION CONTROLS, by Yu-Pei Ke and Stanley A. Mumma, published in ASHRAE Transactions, V103(2), pp. 365-374, 1997 is hereby incorporated by reference in its entirety. For example, the controller for measuring $Q_s$ may be an Actuating Terminal Equipment Controller (ATEC) that is part of an APOGEE® or DESIGO® Terminal Equipment Controller (TEC) available from Siemens, the assignee herein. Thus, each parameter in Equation (1) is known and C(t) can be computed.

Figure 5:
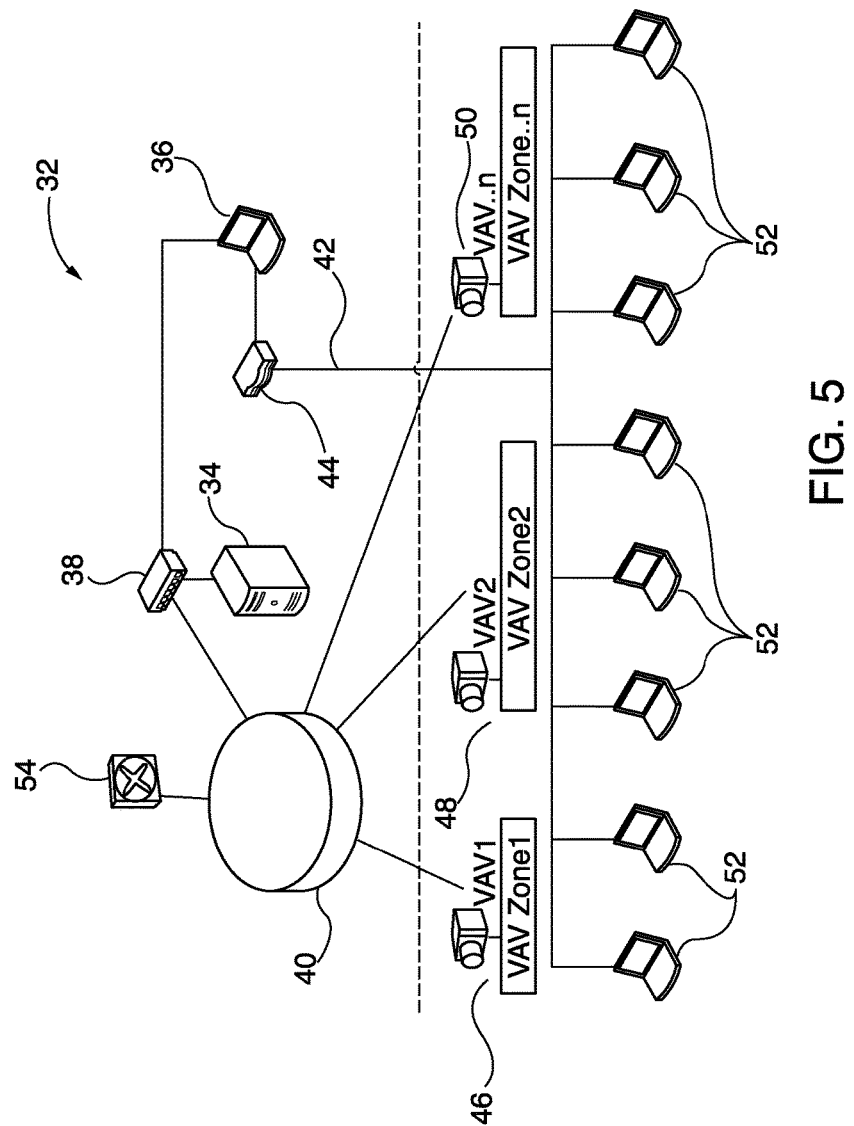
FIG. 5 depicts an exemplary building control system used in conjunction with aspects of the present invention.

Aspects of the present invention may be used in conjunction with a new building control system or integrated into an existing building control system. Referring to FIG. 5, an exemplary building control system 32 is shown. Building control systems encompass a wide variety of systems that aid in the monitoring and control of various aspects of building operation. Building control systems include security systems, fire safety systems, lighting systems, and HVAC systems. In large commercial and industrial facilities, such systems have an extensive number of elements and are highly automated.

The elements of a building control system may be widely dispersed throughout a facility. For example, an HVAC system includes temperature sensors and ventilation damper controls as well as other elements that are located in several areas of a facility. Similarly, a security system may have intrusion detection, motion sensors and alarm actuators dispersed throughout an entire building or campus. Likewise, fire safety systems include smoke alarms and pull stations dispersed throughout the facility. To achieve efficient and effective building control system operation, there is a need to monitor the operation of, and often communicate with, the various dispersed elements of a building control system.

Accordingly, a building control system 32 may include at least one centralized control station or system server 34 in which data from the building control system 32 may be monitored, and in which various aspects of system operation may be controlled and/or monitored. The control station 32 typically includes a computer having processing equipment, data storage equipment, and a user interface. A facility manager workstation 36 is connected via a building management system (BMS) network hub 38 to the control station server 34 and a BMS network 40. In addition, the facility manager workstation 36 is connected to an IT network 42 by a router 44. For purposes of illustration, the building control system 32 may include first 46, second 48 and third 50 zones although it is understood that additional or fewer zones may be included. Each zone 46, 48, 50 may include at least one workstation 52 each indicating an occupant. For example, the first 46, second 48 and third 50 zones in FIG. 5 indicate two, three and three occupants, respectively, although it is understood that each zone 46, 58, 50 may include additional or fewer occupants. Each user workstation 52 is first connected to the IT network 42 and then to the BMS network 40. In addition, actuator units such as fans 54 may be connected to the BMS network 40. An example of a building control system 32 that may be used is the APOGEE® or DESIGO® Building Automation System available from Siemens. With regard to building control systems, the disclosure of U.S. Pat. No. 9,104,183, issued Aug. 11, 2015 to Zheng et al. and entitled ADVANCED HUMAN-MACHINE INTERFACE FOR COLLABORATIVE BUILDING CONTROL is hereby incorporated by reference in its entirety.

Figure 6:
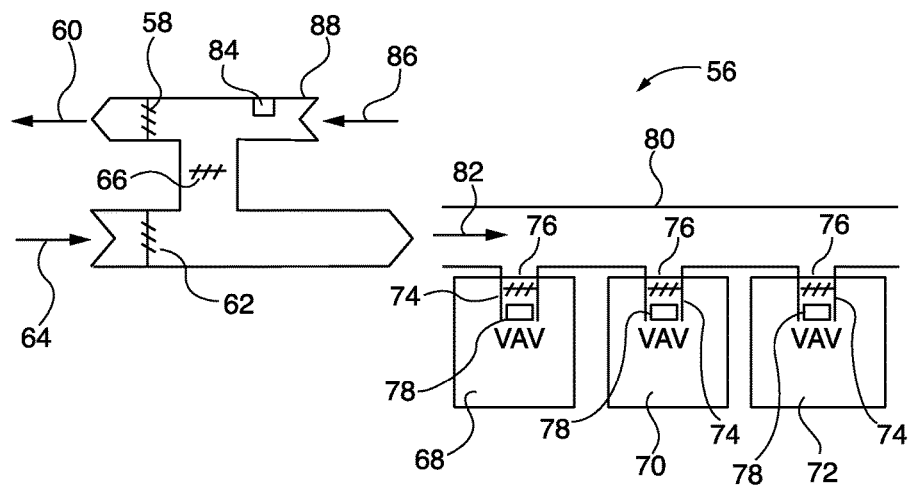
FIG. 6 depicts an exemplary an air handling unit (AHU) system schematic.

Referring to FIG. 6, an exemplary AHU system 56 schematic is shown. The AHU 56 includes a discharge air damper 58 for controlling a discharge of discharge air 60, an outdoor air damper (OAD) 62 for controlling a supply of outdoor air 64 and a mix air damper 66 for controlling mixing of return air 86 and outdoor air 64 to form supply air 82. The supply air 82 is conveyed by a supply air duct 80 to first 68, second 70 and third 72 thermal zones although it is understood that additional or fewer zones may be associated with the AHU 56. Further, each zone 68, 70, 72 may include one or more rooms, enclosed spaces or other areas of a building. A variable air volume (VAV) terminal box 74 is associated with each zone 68, 70, 72. Each VAV box 74 includes a VAV damper (i.e. VAVD) 76 for receiving the supply air 82 and controlling airflow into a respective zone 68, 70, 72. Each VAV box 74 also includes a VAV cooling/heating coil 78 for controlling air temperature within a respective zone 68, 70, 72. It is noted that the OAD 62 and the VAVD 76 may each include an actuator for moving a damper to control airflow. Further, VAV coil 78 may include an actuator for operating a cooling/heating coil valve for controlling temperature.

Figure 7:
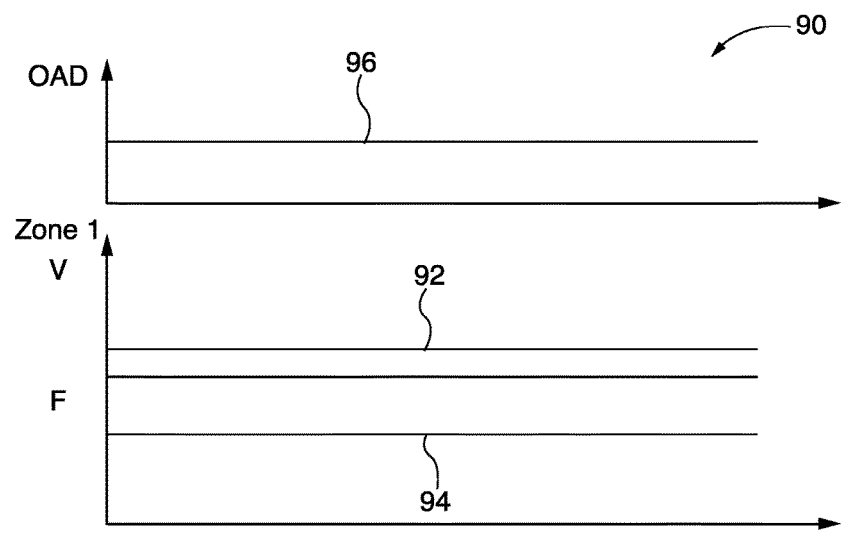
FIG. 7 depicts a conventional demand control ventilation (DCV) outdoor air control signal sequence during a cooling season for an AHU having a variable air volume (VAV) terminal box associated with a first thermal zone.

A single $CO_2$ sensor 84 is located in a return air duct 88 of the AHU 56. In this configuration, the supply air 82 for the first 68, second 70 and third 72 zones has the same outdoor air ratio. However, if the first zone 68 includes a large meeting room while the third zone 72, for example, includes a single person office, there may be a substantial difference in demand for outdoor air 64 between the first 68 and third 72 zones. Further, ASHRAE Standard 62.1 requires 5 CFM of outdoor air 64 per person for an office environment whereas different environments such as in a health care facility require more outdoor air 64. Conventional DCV control sequences for AHUs cannot provide an outdoor air ratio that may be adjusted in response to an outdoor air demand for a particular zone. Referring to FIG. 7, a conventional DCV outdoor air control signal sequence 90 during a cooling season for an AHU having a VAV terminal box associated with a first zone is shown. In particular, FIG. 7 depicts a VAV cooling/heating coil valve set point signal (i.e. V set point signal) 92 and VAVD flow set point signal 94 (i.e. F set point signal) for the VAV box and an OAD control signal (i.e. OAD control signal) 96 for the AHU. As can be seen in FIG. 7, the OAD position 96, V 92 and F 94 signals remain constant during the control sequence 90.

Figure 8:
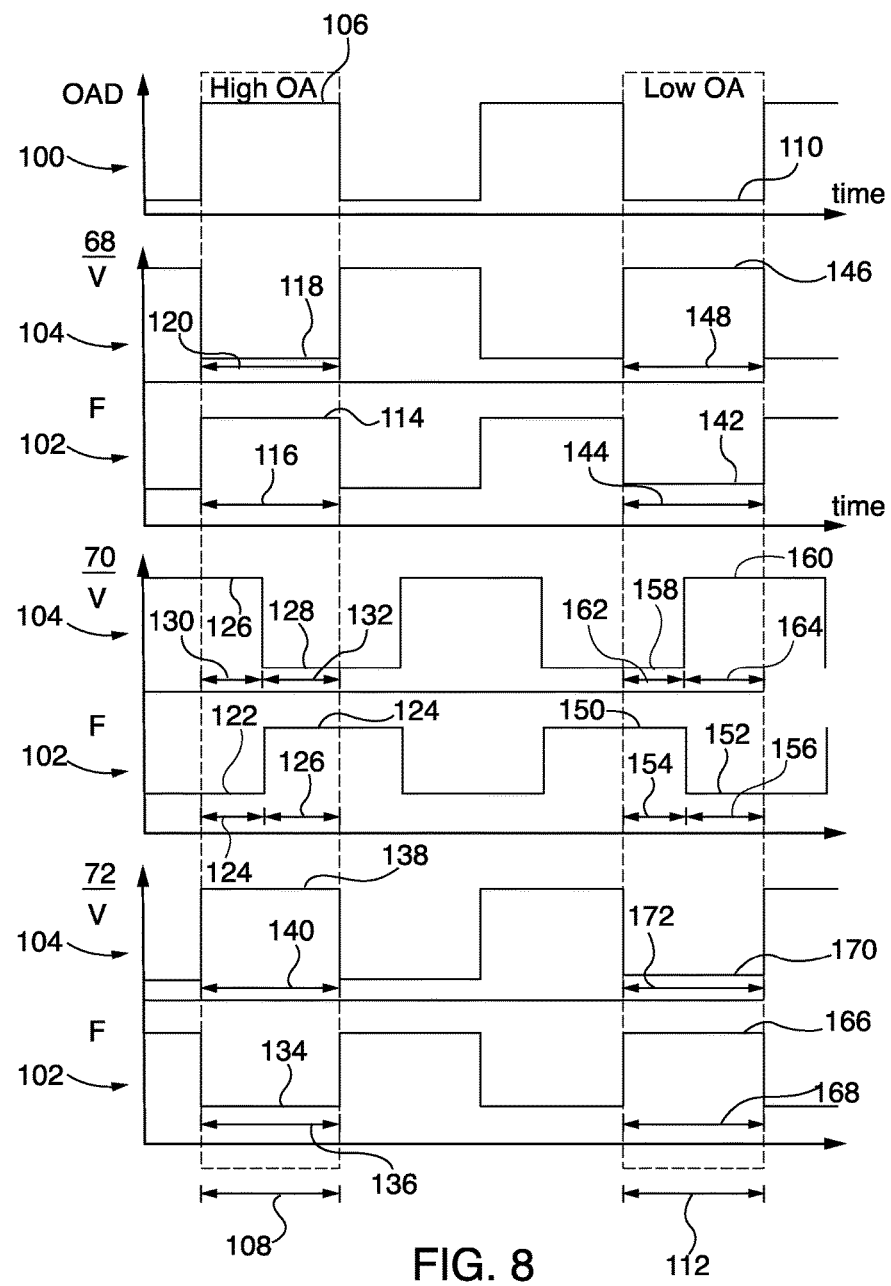
FIG. 8 depicts outside air damper (OAD), variable air volume damper flow set point (F) and VAV cooling/heating coil set point (V) outdoor air control signal sequences for first, second and third thermal zones in accordance with aspects of the present invention.

In accordance with aspects of the present invention, pulse width modulation (PWM) techniques are used for the OAD control, V temperature set point and F flow set point signals in order to provide sufficient outdoor air to meet outdoor air requirements for each zone 68, 70, 72, in a building by separating or decoupling breathing air from conditioning air (i.e. air used for air conditioning purposes) are mixed. Referring to FIG. 8, OAD control 100, F set point 102 and V set point 104 signal sequences for the first 68, second 70 and third 72 zones in accordance with aspects of the present invention are shown. In order to meet outdoor air requirements while maintaining a room temperature for a zone 68, 70, 72, which may be a different temperature than the other zones, square wave control signals having suitable frequencies are used for the OAD control 100, F set point 102 and V set point 104 signals.

In accordance with aspects of the present invention, the OAD control signal 100 is increased to a relatively high level 106, thus substantially opening the OAD 62, for a high outdoor air time period 108 for the first 68, second 70 and third 72 zones. In addition, the OAD signal 62 is decreased to a relatively low level 110, thus substantially closing the OAD 62, for a low outdoor air time period 112 for the first 68, second 70 and third 72 zones. During the high outdoor air time period 108, the supply air duct 80 is used to convey breathing air, whereas during the low outdoor air time period 112, the supply air duct 80 is used to convey conditioning air. In accordance with aspects of the invention, this separates or decouples the breathing air from the conditioning air.

In the following description, a hypothetical example will be described wherein the first zone 68 requires or demands more outdoor air 64 than the second 70 and third 72 zones, the third zone 72 requires less outdoor air 64 than the first 68 and second 72 zones and the second zone 72 requires a median amount of outdoor air 64 during the high outdoor air time period 108. With respect to the first zone 68 during the high outdoor air time period 108 (i.e. OAD is substantially open), the F set point signal 102 is increased to a relatively high level 114 to provide a high flow set point (i.e. VAVD substantially open) for an F signal time period 116 that substantially corresponds to the high outdoor air time period 108 to allow additional outdoor air 64 to enter the first zone 68. In order to avoid over cooling and maintain the temperature in the first zone 68 during this period, the V set point signal 104 is correspondingly decreased to a relatively low level 118 to provide a low temperature set point for a V signal time period 120 that substantially corresponds to the F signal time period 116 so that the temperature in the first zone 68 does not change.

As previously described, the second zone 70 requires a median amount of outdoor air 64. Accordingly, the F set point signal 102 is at both relatively low 122 (i.e. VAVD is substantially closed) and high 124 (i.e. VAVD is substantially open) levels to provide low and high flow set points corresponding to first 124 and second 126 F signal time periods, respectively, which together substantially correspond to the high outdoor air time period 108 (i.e. OAD is substantially open). Thus, the VAVD 76 is open for only a portion of the time that the OAD 62 is open to provide a median amount of outdoor air 64 relative to the first 68 and third 72 zones. Further, the V set point signal 104 is at both relatively high 126 and low 128 levels to provide high and low temperature set points for first 130 and second 132 V time periods that correspond to the first 124 and second 126 F signal time periods, respectively.

With respect to the third zone 72 during the high outdoor air time period 108 (i.e. OAD is substantially open), this zone requires less outdoor air 64 than the first 68 and second 70 zones as previously described. Accordingly, the F set point signal 102 is decreased to a relatively low level 134 to provide a low flow set point (i.e. VAVD substantially closed) for an F signal time period 136 that substantially corresponds to the high outdoor air time period 108 to minimize the amount of outdoor air that enters the third zone 72. Further, the V set point signal 104 is correspondingly increased to a relatively high level 138 to provide a high temperature set point signal for a V signal time period 140 that substantially corresponds to the F signal time period 136 so that the third zone 72 has a suitable temperature.

In the following description, the F 102 and V 104 signal sequences for the first 68, second 70 and third 72 zones during the low outdoor air time period 112 (i.e. OAD is substantially closed) will be described. With respect to the first zone 68 during the low outdoor air time period 112 (i.e. OAD is substantially closed), the F set point signal 102 is decreased to a relatively low level 142 to provide a low flow set point (i.e. VAVD substantially closed) for an F signal time period 144 that substantially corresponds to the low outdoor air time period 112 to minimize the amount of outdoor air that enters the first zone 68. In order to maintain the temperature in the first zone 68 during this period, the V set point signal 104 is correspondingly increased to a relatively high level 146 to provide a high temperature set point for a V signal time period 148 that substantially corresponds to the F signal time period 144 so that the temperature in the first zone 68 does not change.

As previously described, the second zone 70 requires a median amount of outdoor air 64. Accordingly, the F set point signal 102 is at both relatively high 150 (i.e. VAVD is substantially open) and low 152 (i.e. VAVD is substantially closed) levels to provide high and low flow set points corresponding to first 154 and second 156 F signal time periods, respectively, which together substantially correspond to the low outdoor air time period 112 (i.e. OAD is substantially closed). Thus, the VAVD 76 is open for only a portion of the time that the OAD 62 is open to provide a median amount of outdoor air 64 relative to the first 68 and third 72 zones. Further, the V set point signal 104 is at both relatively low 158 and high 160 levels to provide low and high temperature set points for first 162 and second 164 V time periods that correspond to the first 154 and second 156 F signal time periods, respectively.

With respect to the third zone 72 during the low outdoor air time period 112 (i.e. OAD is substantially closed), this zone requires less outdoor air 64 than the first 68 and second 72 zones as previously described. Accordingly, the F set point signal 102 is increased to a relatively high level 166 to provide a high flow set point (i.e. VAVD substantially open) for an F signal time period 168 that substantially corresponds to the low outdoor air time period 112. Further, the V set point signal 104 is correspondingly decreased to a relatively low level 170 to provide a low temperature set point for a V signal time period 172 that substantially corresponds to the F signal time period 168 so that the third zone 72 has a suitable temperature.

Thus, in accordance with aspects of the present invention, a single duct (i.e. supply air duct 80) conveys breathing air and conditioning air at different time slots. This enables individual control of the $CO_2$ level of different zones as previously described.

Further, energy savings are realized in accordance with aspects of the present invention. In accordance with ASHRAE Standard 62.1, the amount of outdoor air required for an office is given by Equation (2):

$$Foa = 1.3 \times (Pa \times 5 + A \times 0.06) \qquad (2)$$

where:

Foa=amount of outdoor air required for an office, CFM;

Pa=number of occupants; and

A=area of the building, ft$^2$.

In addition, a 30% redundancy is utilized in order to mitigate the discomfort due to coupling between the breathing air and conditioning air.

Figure 9:
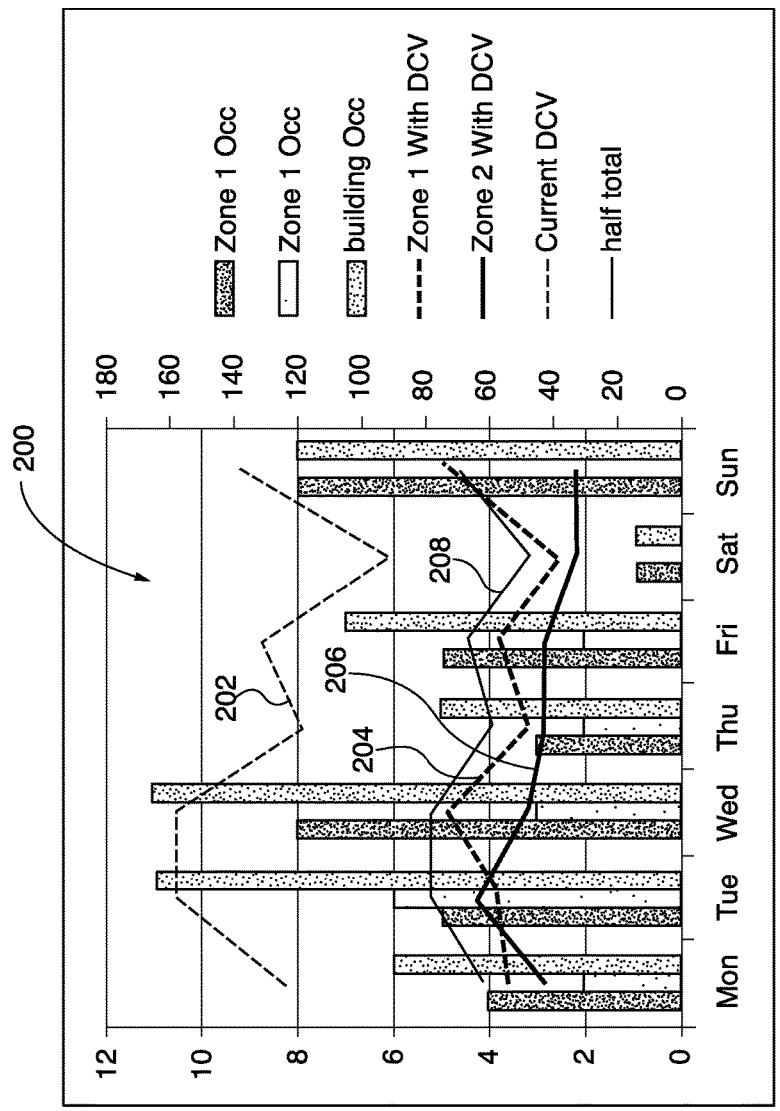
FIG. 9 depicts exemplary graphs of outdoor air flow rates (in CFM) for an exemplary building when using a conventional DCV outdoor air control signal sequence and a DCV outdoor air control signal sequence in accordance with aspects of the present invention.

FIG. 9 depicts exemplary graphs 200 of outdoor air flow rates (in CFM) for an exemplary building when using a conventional DCV outdoor air control signal sequence and a DCV outdoor air control signal sequence in accordance with aspects of the present invention. In the example for FIG. 9, the building has an area of 1100 ft$^2$ and includes two zones (i.e. Zone 1 and Zone 2). FIG. 9 depicts a "Current DCV" graph 202 which is a graph of the total building outdoor air flow rate.

In conventional DCV methods, the outdoor air 64 is uniformly distributed between Zone 1 and Zone 2 which is shown as "half total" graph 208 in FIG. 9. In the case where there is a significant difference between the number of occupants between Zone 1 and Zone 2, outside air flow rate requirements may not be met. For example, if there are 8 occupants in Zone 1 and no occupants in Zone 2 on Sunday (see FIG. 9), conventional DCV methods require approximately 140 CFM (see Equation (2)) of outdoor air 64 for the building that is uniformly distributed between Zone 1 and Zone 2. Therefore, Zone 1 receives half of the 140 CFM outdoor air flow rate (i.e. 70 CFM of outdoor air) which is not sufficient for meeting outdoor air requirements for the occupants. At the same time, the remaining half of the 140 CFM outdoor air flow rate (i.e. 70 CFM of outdoor air) is distributed to Zone 2, which has no occupants, thus wasting energy. Methods in accordance with aspects of the present invention result in 73 CFM of outdoor air 64 being distributed to Zone 1 and 33 CFM of outdoor air 64 being distributed to Zone 2 (see "Zone 1 with DCV" 204 and "Zone 2 with DCV" 206 graphs, respectively, in FIG. 9) resulting in a total of 106 CFM. Thus, an amount of energy consumed to generate the outdoor air flow rates for both Zone 1 and Zone 2 is reduced while also meeting outdoor air flow requirements. Referring to FIG. 9, a difference between the "half total" graph 208 and the "Zone 1 with DCV" graph 204 and between "half total" graph 208 and the "Zone 2 with DCV" graph 206 reflects energy savings. As previously described, aspects of the present invention provide breathing air that is decoupled from conditioning air thus enabling the supply of different amounts of outdoor air 64 to a respective zone.

Figure 10:
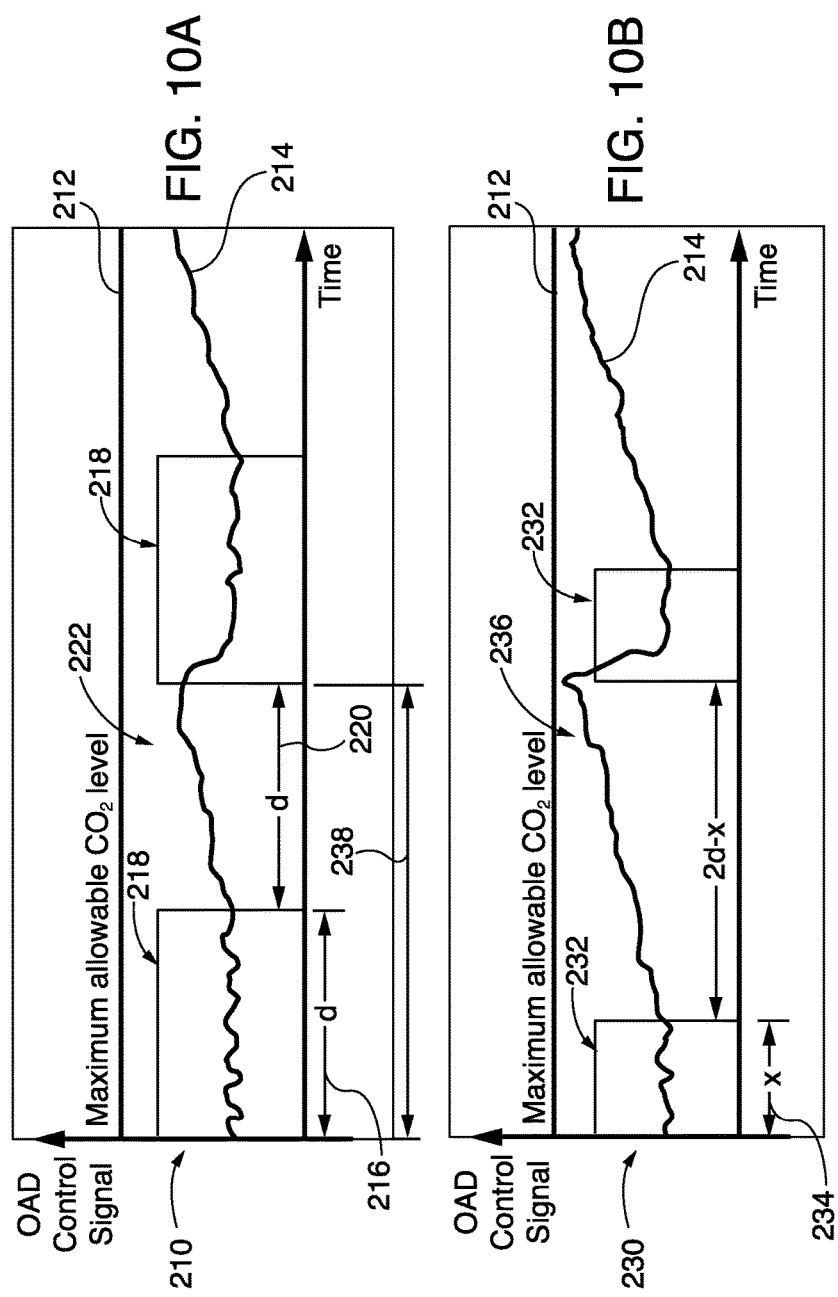
FIG. 10A shows an embodiment in accordance with aspects of the present invention wherein a PWM technique for controlling an OAD signal is used to achieve energy savings.
FIG. 10B depicts an alternate embodiment for controlling the OAD control signal in order to achieve energy savings.

FIG. 10A shows an embodiment in accordance with aspects of the present invention wherein a PWM technique for controlling an OAD control signal 210 is used to achieve energy savings. In this embodiment, a frequency of pulses in the OAD control signal 210 is kept constant but a duty cycle (i.e. on time/total time period of the OAD control signal) is changed based on a maximum allowable $CO_2$ requirement 212. FIG. 10A depicts a square pulse OAD control signal 210, an actual or current $CO_2$ level 214 present in an exemplary zone of a building and a maximum allowable $CO_2$ level 212 for the zone. The OAD control signal 210 has a duty ratio given by Equation (3):

$$D=(d/2d) \quad (3)$$

where:
D=duty ratio;
d=ON time period 216 (i.e. OAD control signal 210 is on 218) or OFF time period 220 (i.e. OAD control signal 210 is off 222); and
2d=total period 238 for the OAD control signal 210.

For the OAD control signal 210 shown in FIG. 10A, the duty ratio 0.5.

Referring to FIG. 10A, the $CO_2$ level 214 remains relatively low and below the maximum allowable CO2 level 212 when the OAD control signal 210 is on 218 during the ON time period 216. When the OAD control signal 210 is off time period 222 during the OFF time period 220, thus turning off a supply of outside air 64, the $CO_2$ level 214 in the zone begins to increase. The OAD control signal 210 is then turned on 218 before the $CO_2$ level 214 reaches the maximum allowable $CO_2$ level 212 so as to again decrease the $CO_2$ level 214. Therefore, the amount of energy used in cooling (or heating) the outside air 64 is directly proportional to the time for which the OAD control signal 210 is turned on 216.

Referring to FIG. 10B, an alternate embodiment for controlling an OAD control signal 230 in order to achieve energy savings is shown. In this embodiment, the OAD control signal 230 is on 232 for an X time period 234 that is less than the ON time period 216 (see FIG. 10A) while maintaining the same total period for the OAD control signal 230 (i.e. 2d). When the OAD control signal 230 is turned off 236 after the X time period 234, thus turning off a supply of outside air 64, the $CO_2$ level 214 in the zone begins to increase. The OAD control signal 230 is then turned on 232 before the $CO_2$ level 214 reaches the maximum allowable $CO_2$ level so as to again decrease the $CO_2$ level 214.

In this embodiment, the amount of energy spent in cooling (or heating) the outside air 64 is equivalent to the X time period 234. Since the total period of the OAD control signal 230 is kept constant at 2d as previously described, the duty cycle of the OAD control signal 230 is reduced to D=(X/2d). Thus, the optimal value for the X time period 234 can be computed depending upon the number of people in the zone so as to enable greater energy savings. For example, if the optimal value of X is equal to d/2, the duty cycle will be 0.25 and the amount of energy savings is increased by 50%.

Embodiments of the present invention may be implemented or retrofitted in various types of already existing buildings or new buildings, such as office buildings, having an HVAC system that is associated with more than one zone and a VAV box associated with each zone. In addition, embodiments of the present invention may be integrated without additional hardware and with existing building control systems such as the APOGEE® or DESIGO® Building Automation System available from Siemens. In particular, embodiments of the present invention may be implemented in in various forms of software, firmware, special purpose processes, or a combination thereof.

Figure 11:
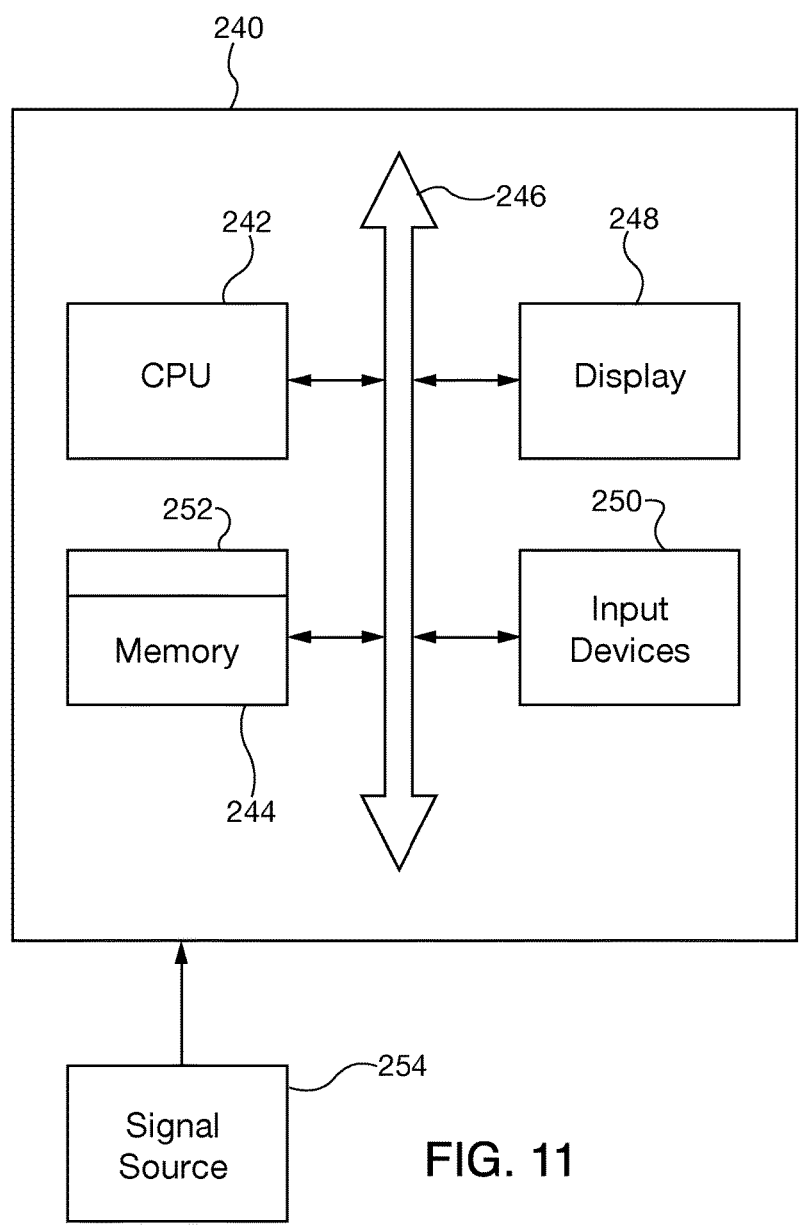
FIG. 11 depicts a high level block diagram of a computer system.

Aspects of the present invention may be implemented in software as an application program tangible embodied on a computer readable program storage device. The application program can be uploaded to, and executed by, a machine comprising any suitable architecture. Aspects of present invention may be implemented by using a computer system. A high level block diagram of a computer system 240 is illustrated in FIG. 11. The computer system 240 may use well known computer processors, memory units, storage devices, computer software and other components. The computer system 240 can comprise, inter alia, a central processing unit (CPU) 242, a memory 244 and an input/output (I/O) interface 246. The computer system 240 is generally coupled through the I/O interface 246 to a display 248 and various input devices 250 such as a mouse and keyboard. The support circuits can include circuits such as cache, power supplies, clock circuits, and a communications bus. The memory 244 can include random access memory (RAM), read only memory (ROM), disk drive, tape drive, etc., or a combination thereof. Aspects of the present invention can be implemented as a routine 252 that is stored in memory 244 and executed by the CPU 242 to process a signal from a signal source 254. As such, the computer system 240 is a general-purpose computer system that becomes a specific purpose computer system when executing the routine 252 in accordance with aspects of the present invention. The computer system 240 can communicate with one or more networks such as a local area network (LAN), a general wide area network (WAN), and/or a public network (e.g., the Internet) via a network adapter. In addition the computer system 240 may be used as a server as part of a cloud computing system where tasks are performed by remote processing devices that are linked through a communications network. In a distributed cloud computing environment, program modules may be located in both local and remote computer system storage media including memory storage devices.

The computer system 240 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device. Examples of well-known computing systems, environments, and/or configurations that may be suitable for use with computer system 240 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

It is to be further understood that, because some of the constituent system components and method steps depicted in the accompanying figures may be implemented in software, the actual connections between the system components (or the process steps) may differ depending upon the manner in which aspects of the present invention are programmed. Given the teachings of aspects of present invention provided herein, one of ordinary skill in the related art will be able to contemplate these and similar implementations or configurations of aspects of the present invention.

The system and processes of the figures are not exclusive. Other systems, processes and menus may be derived in accordance with aspects of the invention to accomplish the same objectives. Although aspects of the present invention have been described with reference to particular embodiments, it is to be understood that the embodiments and variations shown and described herein are for illustration purposes only. Modifications to the current design may be implemented by those skilled in the art, without departing from the scope of the aspects of the present invention. As described herein, the various systems, subsystems, agents, managers and processes can be implemented using hardware components, software components, and/or combinations thereof.

What is claimed is:

1. A method for operating an air handling apparatus of a heating, ventilation, and air conditioning system associated with first and second thermal zones of an enclosed space having a plurality of zones, wherein the air handling apparatus includes an air handling unit (AHU) or a rooftop unit (RTU) each including an outside air flow actuator and a variable air volume (VAV) device associated with the first and second zones wherein each VAV device includes a VAV air flow actuator and a VAV air temperature control actuator, comprising:

operating the outside air flow actuator to enable breathing air flow in a supply duct during a high outdoor air time period wherein the supply duct conveys breathing air to the first and second zones and wherein the first zone includes a first number of occupants and the second zone includes a second number of occupants that is less than the first number of occupants;

operating the outside air flow actuator to enable conditioning air flow into the supply duct during a low outdoor air time period wherein the supply duct conveys conditioning air to the first and second zones;

operating the AHU or RTU and VAV air flow actuators to provide a desired amount of breathing air from the supply duct to the first zone suitable for the first number of occupants and breathing air to the second zone suitable for the second number of occupants, wherein the AHU or RTU and VAV air flow actuators are operated during the high and low outdoor air time periods; and operating the VAV air temperature control actuator to condition breathing air received from the supply duct to provide conditioning air to the first zone having a suitable temperature for the first number of occupants and conditioning air to the second zone having a suitable temperature for the second number of occupants, wherein the VAV air temperature control actuator is operated during the high and low outdoor air time periods and wherein the outside airflow, VAV air flow and VAV air temperature control actuators are controlled using pulse width modulated signals according to a duty ratio during the high and low outdoor air time periods, wherein the duty ratio is controlled for minimizing outside air introduction to the supply duct while maintaining a carbon dioxide ($CO_2$) level for each of the first zone and the second zone below the maximum allowable $CO_2$ level.

2. The method according to claim 1, further including calculating a carbon dioxide ($CO_2$) level for an associated zone based on a combined $CO_2$ level measurement within the return duct for the first and second zones and tea number of occupants scheduled to be within the associated zone.

3. The method according to claim 2, wherein the number of occupants in a first zone and the number of occupants in a second zone is determined by accessing a personal calendaring application or a web portal.

4. The method according to claim 1, wherein the duty ratio for controlling the outside air flow actuator to maintain a carbon dioxide ($CO_2$) level in a zone is dependent on the number of occupants in the zone.

5. The method according to claim 1, wherein a damper in the AHU or RTU and a damper in the VAV device associated with the first zone is opened wider during the high outdoor air time period than during the low outdoor air time period.

6. The method according to claim 1, wherein the VAV air temperature control actuator associated with the first zone is set at a low occupancy set point.

7. The method according to claim 1, wherein the high and low outdoor air time periods are adjustable in accordance with the occupancy of an individual zone.

8. The method according to claim 1, wherein the VAV air temperature control actuator operates a cooling and/or heating coil valve for controlling temperature.

9. A system for heating, ventilation, and air conditioning associated with first and second thermal zones of an enclosed space having a plurality of zones, the system comprising:
- an air handling unit (AHU) or a rooftop unit (RTU) comprising:
- an outside air flow actuator and a variable air volume (VAV) device associated with the first and second zones wherein each VAV device includes a VAV air flow actuator and a VAV air temperature control actuator;
- a controller configured to operate the outside air flow actuator to enable breathing air flow in a supply duct during a high outdoor air time period wherein the supply duct conveys breathing air to the first and second zones and wherein the first zone includes a first number of occupants and the second zone includes a second number of occupants that is less than the first number of occupants;
- and to enable conditioning air flow into the supply duct during a low outdoor air time period wherein the supply duct conveys conditioning air to the first and second zones;
- the controller further configured to operate the AHU or RTU and VAV air flow actuators to provide a desired amount of breathing air from the supply duct to the first zone suitable for the first number of occupants and breathing air to the second zone suitable for the second number of occupants, wherein the AHU or RTU and VAV air flow actuators are operated during the high and low outdoor air time periods;
- the controller further configured to operate the VAV air temperature control actuator to condition breathing air received from the supply duct to provide conditioning air to the first zone having a suitable temperature for the first number of occupants and conditioning air to the second zone having a temperature suitable for the second number of occupants;
- a carbon dioxide ($CO_2$) sensor in a return air duct of the AHU, wherein the $CO_2$ sensor detects a combined $CO_2$ level generated by the occupants in the first and second zones; and
- wherein the controller is configured to calculate a maximum allowable $CO_2$ level for an associated zone based on a combined $CO_2$ level measurement within the return duct for the first and second zones and the number of occupants in the associated zone, and responsive to the detected combined $CO_2$ level, generate a pulse width modulated control signal for the outside air flow actuator, wherein the duty ratio is controlled for minimizing outside air introduction to the supply duct while maintaining a carbon dioxide ($CO_2$) level for each of the first zone and the second zone below the maximum allowable $CO_2$ level.

10. The system according to claim 9, wherein the high and low outdoor air time periods are adjustable in accordance with the occupancy of an individual zone.

11. The system according to claim 9, wherein a damper in the AHU or RTU and a damper in the VAV device associated with the first zone is opened wider during the high outdoor air time period than during the low outdoor air period.

12. The system according to claim 9, wherein the VAV air temperature control actuator associated with first zone is set to a low occupancy set point.

13. The system according to claim 9, wherein the method is implemented as part of a building control system.

* * * * *